(12) United States Patent
Urakawa et al.

(10) Patent No.: US 8,953,210 B2
(45) Date of Patent: Feb. 10, 2015

(54) FUNCTION EXECUTION DEVICE

(71) Applicants: Yutaka Urakawa, Nagoya (JP);
Kazunori Tachi, Inazawa (JP)

(72) Inventors: Yutaka Urakawa, Nagoya (JP);
Kazunori Tachi, Inazawa (JP)

(73) Assignee: Brother Kogyo Kabushiki Kaisha,
Nagoya-shi, Aichi-ken (JP)

( * ) Notice: Subject to any disclaimer, the term of this patent is extended or adjusted under 35 U.S.C. 154(b) by 0 days.

(21) Appl. No.: 14/178,387

(22) Filed: Feb. 12, 2014

(65) Prior Publication Data

US 2014/0240763 A1      Aug. 28, 2014

(30) Foreign Application Priority Data

Feb. 28, 2013    (JP) ................................. 2013-038341

(51) Int. Cl.
*G06F 15/00* (2006.01)
*G06F 3/12* (2006.01)
*G06K 1/00* (2006.01)
*H04N 1/00* (2006.01)

(52) U.S. Cl.
CPC .......... *H04N 1/00411* (2013.01); *G06F 3/1292* (2013.01)
USPC ......................................... 358/1.15; 358/1.13

(58) Field of Classification Search
CPC ........................... H04N 1/00411; G06F 3/1292
USPC .................. 358/1.1, 1.15, 1.13, 1.14
See application file for complete search history.

(56) References Cited

U.S. PATENT DOCUMENTS

| 2006/0171734 | A1 | 8/2006 | Maeda |
| 2009/0103124 | A1 | 4/2009 | Kimura et al. |
| 2011/0043857 | A1 | 2/2011 | Hiroki |
| 2011/0286028 | A1* | 11/2011 | Kinouchi et al. ............ 358/1.14 |
| 2013/0155450 | A1* | 6/2013 | Higashikawa ............... 358/1.15 |
| 2014/0135036 | A1* | 5/2014 | Bonanni et al. ............ 455/456.3 |

FOREIGN PATENT DOCUMENTS

| JP | 2007-166538 A | 6/2007 |
| JP | 2008-135959 A | 6/2008 |
| JP | 2009251823 A | 10/2009 |
| JP | 2012-064030 A | 3/2012 |

OTHER PUBLICATIONS

Jun. 4, 2014—(EP) Extended Search Report—App 13185401.0.

* cited by examiner

*Primary Examiner* — Douglas Tran
(74) *Attorney, Agent, or Firm* — Banner & Witcoff, Ltd.

(57) ABSTRACT

A function execution may device determine whether the function execution device can communicate with an external device using a short-range communication protocol when a first screen is displayed on a display screen. When the function execution device determines that the function execution device can communicate with the external device using the short-range communication protocol, the function execution device may display a second screen that indicates an operation to be performed using the external device to start executing a predetermined function of the function execution device.

20 Claims, 4 Drawing Sheets

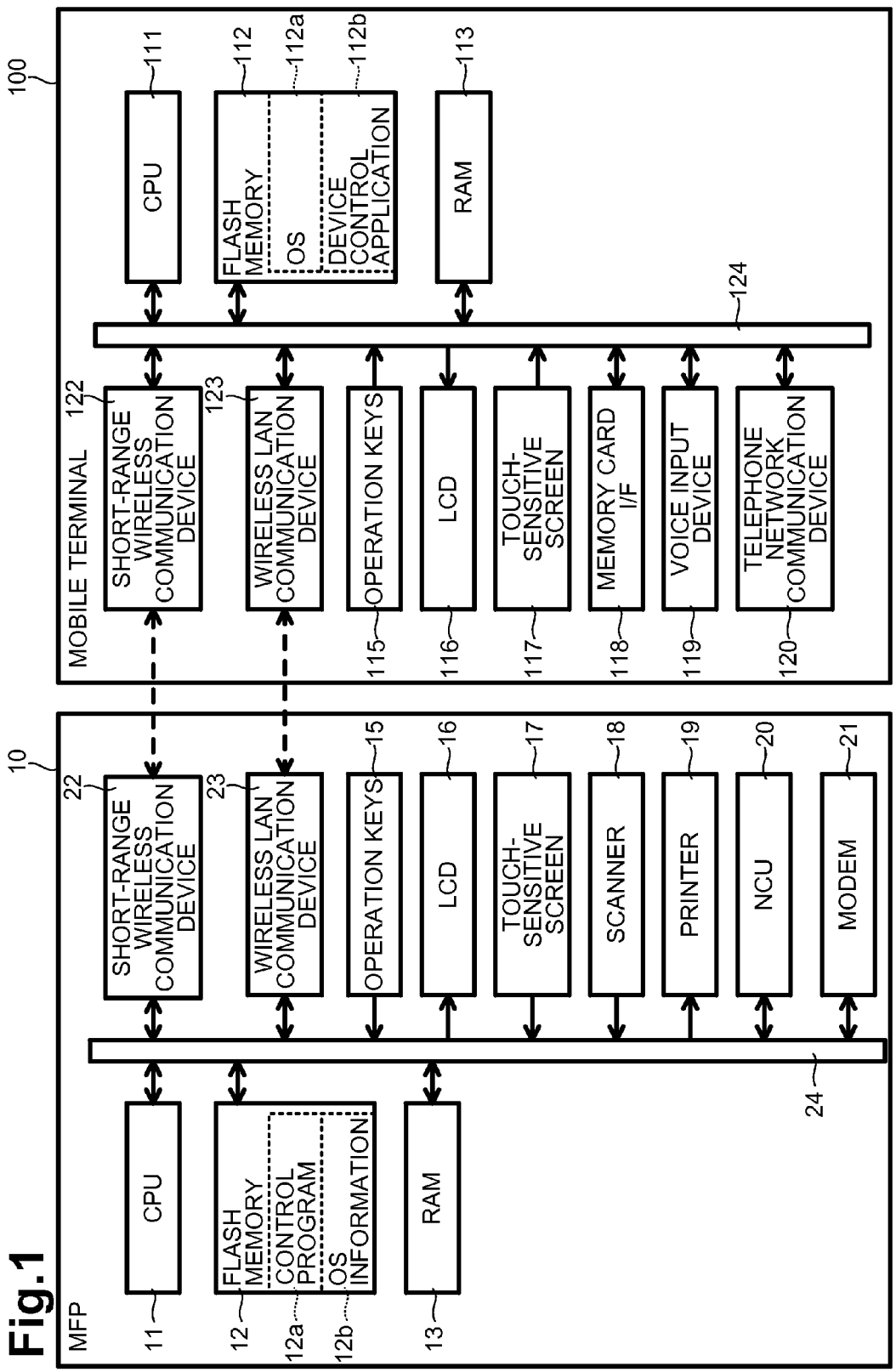

FUNCTION EXECUTION DEVICE

CROSS-REFERENCE TO RELATED APPLICATION

This application claims priority from Japanese Patent Application No. 2013-038341 filed on Feb. 28, 2013, which is incorporated herein by reference in its entirety.

FIELD OF DISCLOSURE

The disclosure herein relates to a function execution device.

BACKGROUND

A known information processing apparatus is configured to generate print data and transmit the print data to a printing apparatus as the information processing apparatus determines that distance between the information processing apparatus and the printing apparatus becomes such a short range that enables wireless communication therebetween.

Usages of external devices, e.g., the above-described information processing apparatus configured to execute a print function of a printing apparatus using short-range wireless communication (e.g., close proximity wireless communication), are diversified according to features of the external devices. For example, different models of the external devices and operating systems installed in the external devices may require different operations for executing functions, such as a print function. Therefore, users who do not fully understand the features of the external devices might not effectively use the external devices and might not be able to execute the print function of a printing apparatus.

BRIEF SUMMARY

Aspects of the disclosure relate to a function execution device in which its functions may be executed readily using a short-range wireless communication protocol.

According to an example embodiment of the disclosure, a function execution device comprises a communication device configured to communicate with an external device (e.g., a remote device) using a short-range communication protocol; a function device configured to execute a predetermined function; a display device; at least one processor; and a memory storing computer-readable instructions therein. When the computer-readable instructions are executed by the at least one processor, they may instruct the function execution device to perform steps comprising: displaying a first screen on the display device; determining whether the communication device is in communication with the external device using the short-range communication protocol; and displaying a second screen, on the display device in response to determining that the communication device can communicate with the external device using the short-range communication protocol. The second screen may indicate an operation to be performed using the external device to start executing a function of the function device. For example, the second screen may include a message telling a user to touch the screen of his/her smartphone, tablet, or the like.

According to another example embodiment of the disclosure, a non-transitory computer-readable storage medium stores computer-readable instructions therein that may be executed by a function execution device comprising a communication device, a function device (e.g., printing unit), and a display device. When the computer-readable instructions are executed by the function execution device, they may instruct the function execution device to perform steps comprising: displaying a first screen on the display device; determining whether the communication device is in communication with an external device using a short-range communication protocol; and displaying a second screen, on the display device, the second screen indicating an operation (e.g., touching, swiping, etc.) to be performed using the external device to start executing a predetermined function (e.g., printing, facsimile transmission, etc.) of the function device. The second screen may be displayed in response to determining that the communication device is in communication with the external device using the short-range communication protocol.

This summary is not intended to identify critical or essential features or aspects of the disclosure, but instead merely summarizes certain features and variations thereof. Other details and features will also be described in the sections that follow.

BRIEF DESCRIPTION OF THE DRAWINGS

Aspects of the disclosure are illustrated by way of example and not by limitation in the accompanying figures in which like reference characters indicate similar elements.

FIG. 1 is a block diagram depicting an electrical configuration of a multifunction peripheral device (MFP) and a mobile terminal in an example embodiment according to one or more aspects of the disclosure.

DETAILED DESCRIPTION

Figure 2A:
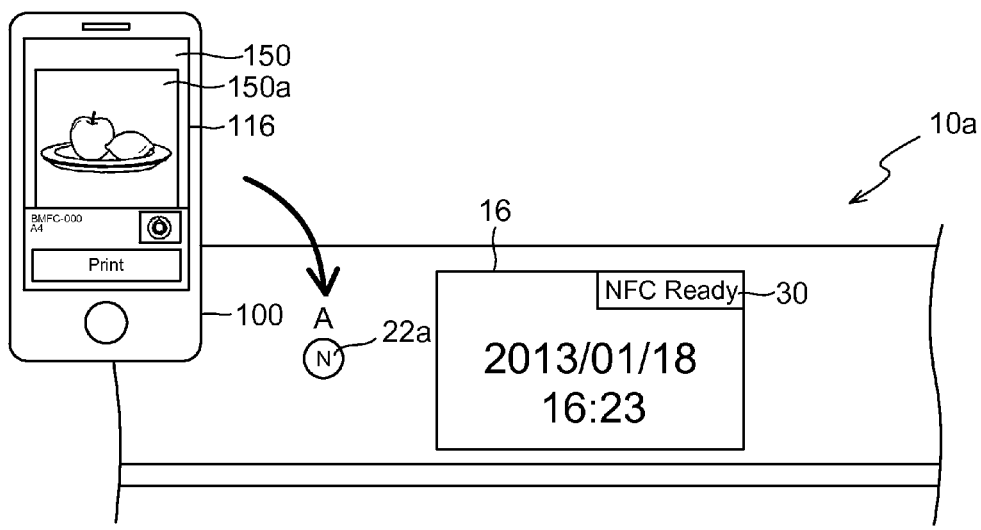
FIGS. 2A-2C are example diagrams depicting a display of the MFP and its periphery and the mobile terminal according to aspects of the disclosure.

Example embodiments will be described in detail herein with reference to the accompanying drawings.

Referring to FIG. 1, a multifunction peripheral device (hereinafter referred to as the "MFP") 10 may be configured to communicate with a mobile terminal 100. The MFP 10 may comprise a print function, a scan function, a facsimile function, and copy function. The MFP 10 may be configured such that the functions, e.g., the print function, of the MFP 10 may be readily controlled by the mobile terminal 100.

The MFP 10 may comprise a central processing unit ("CPU") 11, a flash memory 12, a random-access memory ("RAM") 13, operation keys 15, a liquid crystal display ("LCD") 16, a touch-sensitive screen 17, a scanner 18, a printer 19, a network control unit ("NCU") 20, a modem 21, a short-range wireless communication device 22, and a local area network ("LAN") communication device (e.g., a wireless LAN communication device 23). The devices 11-13 and 15-23 may be interconnected via an input/output port 24 (e.g., a data bus). The CPU 11 may be configured to control functions of the MFP 10 and each device connected to the CPU 11 via the input/output port 24, based on programs, e.g., computer-readable instructions, stored in the flash memory 12, stored in the RAM 13, or received via the NCU 20.

The flash memory 12 may include a nonvolatile memory. The flash memory 12 may store control program 12a, e.g., computer-readable instructions, configured to control operations of the MFP 10. The CPU 11 may execute processes shown in the flowchart of FIG. 4, based on the control program 12a. The flash memory 12 may store operating system ("OS") information 12b. The OS information 12b may include information for identifying a type of the OS for which a first operation guide screen 51 (refer to FIG. 3C) may be displayed in print processing (see S407 of FIG. 4). The OS information 12b that may be provided by the manufacturer of the MFP 10 may be stored as default information in the flash memory 12. The OS information 12b may be updated whenever necessary based on update information supplied by the manufacturer or others. In the example embodiments, the OS information 12b, which may include information for identifying, for example, an Android™ OS (platform provided by Google Inc. of Mountain View, Calif.), may be stored in the flash memory 12. The RAM 13 may be a rewritable volatile memory. The RAM 13 may have an area in which various data may be temporarily stored when the CPU 11 executes the control program 12a.

The operation keys 15 may comprise mechanical keys that may permit instructions and various settings to be input into the MFP 10. The operation keys 15 may be disposed on a casing of the MFP 10. The LCD 16 may be a liquid crystal display configured to display various screens. The touch-sensitive screen 17 may be disposed over the LCD 16. The touch-sensitive screen 17 may be configured to sense a position where an object, e.g., a finger or a stylus-like object, is touched onto or is brought into close proximity to a screen of the LCD 16. The touch-sensitive screen 17 may be configured to input the sensed position to the MFP 10. The scanner 18 may be configured to read an image on a document and convert the read image into image data. The printer 19 may be configured to print an image based on image data onto a recording sheet. The modem 21 may be configured to modulate image data to be transmitted as a facsimile via a telephone network (not depicted), and to transmit the facsimile via the NCU 20. The modem 21 may also be configured to demodulate a signal, received from the telephone network via the NCU 20, into the image data. The NCU 20 may be configured to connect between the telephone network and the MFP 10 and control connection with the telephone network by closing or opening a circuit in accordance with an instruction from the modem 21.

The short-range wireless communication device 22 may be an interface to perform short-range wireless communication with another device within an effective range of, for example, approximately 10 cm. In the example embodiment, short-range wireless communication performed by the short-range wireless communication device 22 may be contactless communication based on Near Field Communication ("NFC") standards. Such contactless communication may be hereinafter referred to as "NFC communication". The MFP 10 may connect to the mobile terminal 100 so as to communicate with the mobile terminal 100 comprising a short-range wireless communication device 122, via the short-range wireless communication device 22.

The wireless LAN communication device 23 may be an interface to perform wireless communication with another device using a wireless LAN. In the example embodiment, the communication performed by the wireless LAN communication device 23 may be wireless communication using a wireless LAN that complies with the 802.11b/g standard defined by the Institute of Electrical and Electronics Engineers ("IEEE"). The wireless LAN communication device 23 may connect to the mobile terminal 100 comprising a wireless LAN communication device 123 to perform wireless communication indirectly in an infrastructure mode through an access point (not depicted) acting as a central hub or directly in an ad-hoc mode, based on Wireless Fidelity ("Wi-Fi®") standards (Wi-Fi® is a registered certification mark owned by the Wi-Fi Alliance of Austin, Tex.). The wireless communication based on Wi-Fi® standards may be hereinafter referred to as "Wi-Fi® communication."

The mobile terminal 100 may comprise, for example, smartphones and cellular phones. The mobile terminal 100 may comprise a central processing unit ("CPU") 111, a flash memory 112, a random-access memory ("RAM") 113, operation keys 115, a liquid crystal display ("LCD") 116, a touch-sensitive screen 117, a memory card interface ("memory card I/F") 118, a voice input device 119, a telephone network communication device 120, a short-range wireless communication device 122, and a local area network (LAN) communication device (e.g., a wireless LAN communication device 123). The devices 111-113, 115-120, 122, and 123 may be interconnected, via an input/output port 124 (e.g., a data bus). The CPU 111 may be configured to control each device connected to the CPU 111 via the input/output port 124, based on programs, e.g., computer-readable instructions stored in the flash memory 112 or elsewhere.

The flash memory 112 may be a nonvolatile rewritable memory. The flash memory 112 may store computer-readable instructions, e.g., an operating system ("OS") 112a and a device control application 112b. The CPU 111 may be configured to execute computer-readable instructions, e.g. the OS 112a and the device control application 112b.

The OS 112a, e.g., the Android™ OS, may be basic software, e.g., computer-readable instructions, to realize standard functions of the mobile terminal 100. The device control application 112b may be supplied by a vendor of a device, e.g., the MFP 10, and installed in the mobile terminal 100. The device control application 112b may enable the mobile terminal 100 to use the device (e.g., MFP 10). More specifically, the device control application 112b may enable the mobile terminal 100 to directly use functions of the device, e.g., the print and scan functions, rather than communicate through, for example, a personal computer. The device control application 112b may be an application, e.g., computer-readable instructions, based on the OS 112a, e.g., the Android™ OS.

The operation keys 115 may comprise mechanical keys that may permit instructions and various settings to be input into the mobile terminal 100. The operation keys 115 may be disposed on a casing of the mobile terminal 100. The LCD 116 may be a liquid crystal display configured to display various screens. The touch-sensitive screen 117 may be disposed over the LCD 116. The touch-sensitive screen 117 may be configured to sense a position where an object, e.g., a finger or a stylus-like object, is touched onto or is brought into close proximity to a screen of the LCD 116. The touch-sensitive screen 117 may be configured to input the sensed position to the mobile terminal 100. The memory card I/F 118 may be configured to receive a nonvolatile memory card (not depicted). The memory card I/F 118 may be configured to control the reading and writing of data from and to the memory card. The voice input/output device 121 may be a device for voice input/output and may comprise a microphone and a speaker. The telephone network communication device 122 may comprise a circuit that may permit a telephone call to be placed via cellular networks (not shown). The short-range wireless communication device 122 may be an interface for short-range wireless communication, similar to the short-range wireless communication device 22. The wireless LAN communication device 123 may be an interface for wireless LAN communication, similar to the wireless LAN communication device 23.

The MFP 10 may be configured to allow functions provided in the MFP 10 to be utilized from devices, e.g., the mobile terminal 100, that may have NFC communication capability. Devices with NFC communication capability may be hereinafter referred to as the "NFC-enabled device". In the disclosure, a function of the MFP 10, e.g., the print function, may be utilized from the mobile terminal 100, using NFC communication.

As depicted in FIG. 2A, the MFP 10 may comprise an operation panel 10a comprising the LCD 16 and an antenna 22a of the short-range wireless communication device 22. When an antenna (not depicted) of the short-range wireless communication device 122 of the mobile terminal 100 is brought into close proximity to the antenna 22a in a state in which the short-range wireless communication device 22 is enabled to perform NFC communication, the short-range wireless communication, e.g., NFC communication, may be executed between the short-range wireless communication device 22 of the MFP 10 and the short-range wireless communication device 122 of the mobile terminal 100. In the example embodiment, the antenna of the short-range wireless communication device 122 may be disposed on a rear side of the mobile terminal 100, e.g., on a side opposite to a side where the LCD 116 may be provided.

The MFP 10 may show or display a "ready" indication 30 on the LCD 16 to notify users that the short-range wireless communication device 22 is enabled to perform NFC communication. Therefore, as the antenna of the short-range wireless communication device 122 disposed on the rear side of the mobile terminal 100 is brought into close proximity to the antenna 22a, as indicated by the arrow A in FIG. 2A, with the "ready" indication 30 displayed on the LCD 16, NFC communication may be executed between the MFP 10 and the mobile terminal 100.

The mobile terminal 100 in which the device control application 112b is installed may be allowed to use functions, e.g., the print function, of the MFP 10, via the NFC communication. For example, as depicted in FIG. 2A, the mobile terminal 100 executing the device control application 112b may display a print image screen 150 on the LCD 116. When the antenna of the mobile terminal 100 displaying the print image screen 150 on the LCD 116, is moved into close proximity of the antenna 22a of the MFP 10 displaying the "ready" indication 30 on the LCD 16, the MFP 10 may detect the mobile terminal 100, and may execute NFC communication with the mobile terminal 100. An image 150a displayed in the print image screen 150 may be printed on the recording sheet using the print function of the MFP 10 via NFC communication.

The Android™ OS may be configured to start transferring data to a receiver device, as a predetermined screen of the mobile terminal 100 is touched or tapped. Therefore, the mobile terminal 100 having the OS 112a, e.g., the Android™ OS, installed therein, may require a touch or tap onto the touch-sensitive screen 117 to transfer or send to the MFP 10, data of an image to be printed using the print function of the MFP 10. Therefore, when the mobile terminal 100 whose OS 112a is, for example, the Android™ OS, detects the NFC-enabled device, e.g., the MFP 10, the mobile terminal 100 may display on the LCD 116 a screen 151 that may be touched to transfer the data of the image to be printed to the MFP 10. As the screen 151 is touched, the mobile terminal 100 may transfer the data to the MFP 10.

Figure 2B:
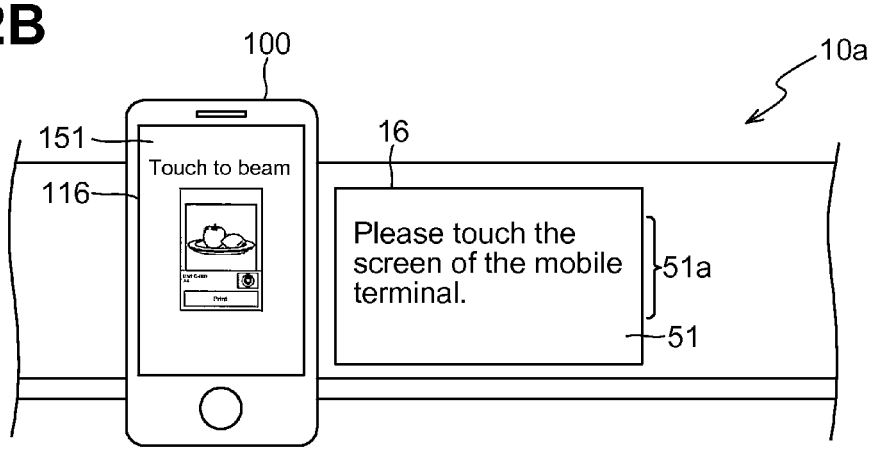
Figure 2C:
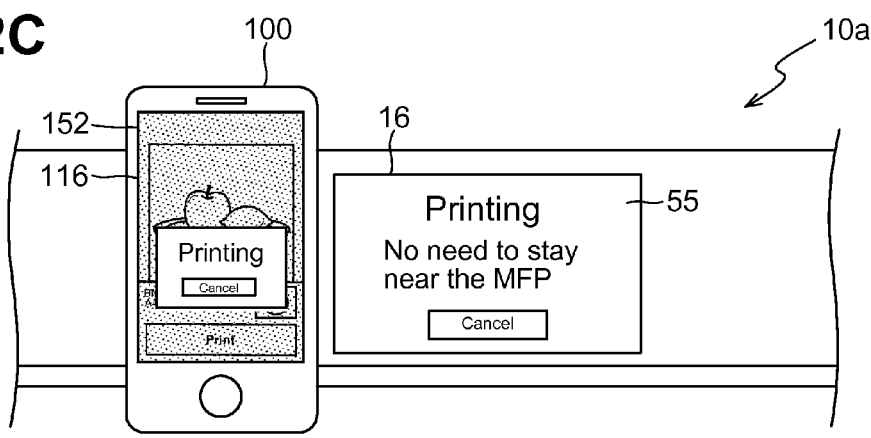

When the MFP 10 detects the mobile terminal 100, the MFP 10 may determine the type of OS of the mobile terminal 100 using the OS information 12b stored in the MFP 10. When the MFP 10 determines the type of the OS of the mobile terminal 100 using the OS information 12b, an operation guide screen including a message that may show a necessary (or required) operation to execute a function of the MFP 10 may be displayed on the LCD 16. In the example embodiment, the flash memory 12 may store the OS information 12b for identifying, for example, the Android™ OS. Therefore, when the MFP 10 detects the mobile terminal 100 configured to execute, for example, the Android™ OS, the MFP 10 may display on the LCD 16, a first operation guide screen 51 including a message 51a reading, e.g., "Touch the screen of the terminal.", as depicted in FIG. 2B.

As described above, the Android™ OS may be configured to start transferring data to a receiver device, as a predetermined screen of the mobile terminal 100 is touched. Therefore, the message 51a displayed in the first operation guide screen 51 may comprise information that may show a necessary operation to start transferring data of an image to be printed from the mobile terminal 100 by executing the print function of the MFP 10. As the first operation guide screen 51 is displayed on the MFP 10, instructions to touch the screen 151 to start executing the print function of the MFP 10 may be presented by the mobile terminal 100. Therefore, the MFP 10 may notify users of required operation(s), such as touching the screen 151 of the mobile terminal 100, to prevent or reduce the likelihood that a user may forget or otherwise fail to perform the required operation(s). Accordingly, cancellation of a print job or other function may be avoided.

When the screen 151 is touched, the mobile terminal 100 may transmit a print instruction to the MFP 10. Then, the mobile terminal 100 may transfer or transmit image data corresponding to the image 150a and print settings to the MFP 10. Based on the image data and print settings received from the mobile terminal 100, the MFP 10 may print an image, e.g., the image 150a, onto a recording sheet with the printer 19. While printing of the image is executed, the MFP 10 and the mobile terminal 100 may display a "printing" screen 55 and 152 on the LCD 16 and 116, respectively.

Figure 3A:
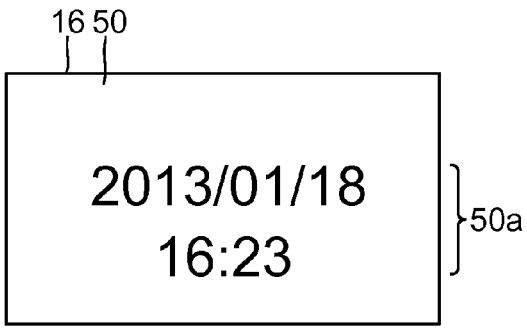
FIG. 3A-3G are example diagrams depicting examples of screens displayed in the display of the MFP according to aspects of the disclosure.
Figure 3B:
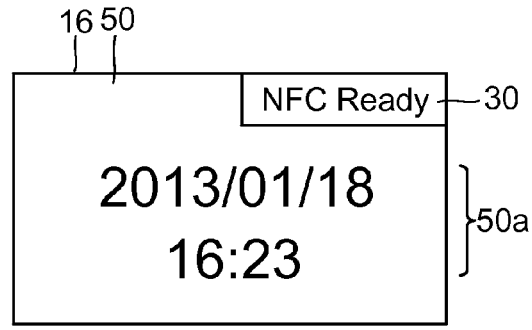

FIGS. 3A-3G depict examples of screens that may be displayed on the LCD 16 of the MFP 10 when the print function of the MFP 10 is used via NFC communication. Referring to FIGS. 3A and 3B, a standby screen 50 may be displayed on the LCD 16 when the MFP 10 is not executing any functions (e.g., printing) and/or waiting for functions to be executed. As depicted in FIGS. 3A and 3B, the standby screen 50 may display date and time 50a.

When the standby screen 50, as depicted in FIG. 3A, is displayed on the LCD 16 and the short-range wireless communication device 22 is enabled to perform NFC communication, the standby screen 50 may display a "ready" indication 30, as depicted in FIG. 3B, to show that the short-range wireless communication device 22 is enabled to perform NFC communication. In various embodiments, the short-range wireless communication device 22 may be enabled at all times or at times when the wireless LAN communication device 23 is not performing Wi-Fi communication. The "ready" indication 30 may be displayed in the LCD 16 on the standby screen 50 and other screens when the short-range wireless communication device 22 is enabled to perform NFC communication.

Figure 3C:
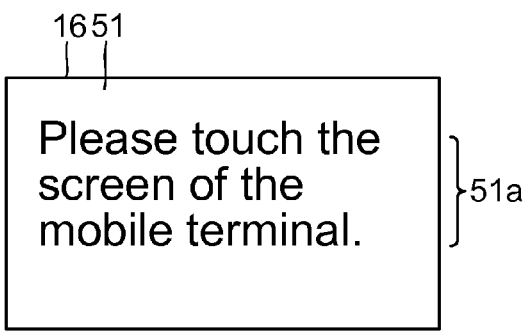

Referring to FIG. 3C, the first operation guide screen 51 may be displayed when the MFP 10 detects the mobile terminal 100 executing, for example, the Android™ OS. The first operation guide screen 51 may comprise the message 51a that may show the necessary operation to execute the print function of the MFP 10. In the example of FIG. 3C, the message 51a, "Please touch the screen of the mobile terminal", may inform users of the requirement to touch the screen of the mobile terminal 100 to perform functions.

Figure 3D:
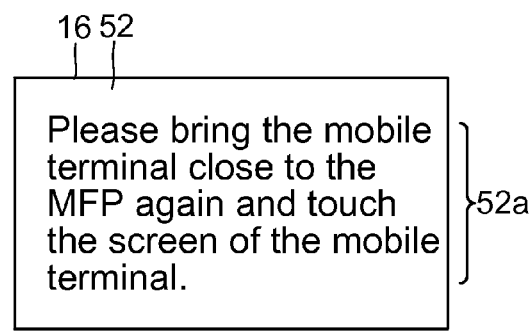

Referring to FIG. 3D, the second operation guide screen 52 may be displayed on the LCD 16 in place of the first operation guide screen 51, when the MFP 10 is not able to detect the mobile terminal 100 after the first operation guide screen 51 is displayed based on the detection of the mobile terminal 100 with the MFP 10. The second operation guide screen 52 may comprise a message 52a that may show a necessary operation again to start executing the print function of the MFP 10. The message 52a—"Please bring the mobile terminal close to the MFP again and touch the screen of the mobile terminal"—may be displayed as depicted in the example of FIG. 3D.

In some situations, the MFP 10 might not be able to detect the mobile terminal 100 after the first operation guide screen 51 is displayed. For example, the mobile terminal 100 may be moved away from the antenna 22a outside an effective range of NFC communication before the screen 151 is touched (or before detection of the screen 151 being touched). When such a situation occurs, the MFP 10 may display the second operation guide screen 52 on the LCD 16. Therefore, a necessary operation to use the print function of the MFP 10 may be understood from the content of the message 52a. Accordingly, a situation in which the print function of the MFP 10 is not performed may be prevented or reduced.

Figure 3E:
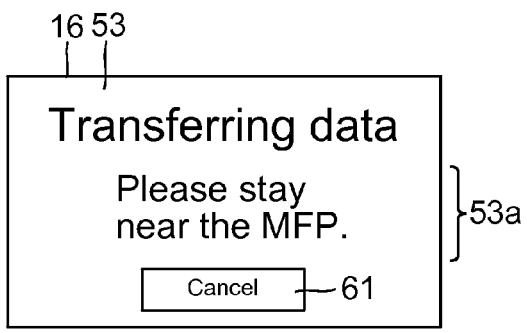

Referring to FIG. 3E, a first "transferring data" screen 53 may be displayed while data is being transferred via Wi-Fi® communication in response to a print instruction. The first "transferring data" screen 53 may be a screen to indicate that the print function of the MFP 10 is being executed. The first "transferring data" screen 53 may comprise a message 53a that may advise not to place the mobile terminal 100 too far away from the MFP 10. The message 53a—"Please stay near the MFP"—may be displayed in the example of FIG. 3E.

An effective range of Wi-Fi® communication may be approximately 100 m, which may be a larger (e.g., wider) data communication range as compared with the communication range of the short-range wireless communication. Due to the wider data communication range of Wi-Fi® communication, a user may tend to leave the MFP 10 while holding the mobile terminal 100 after data transfer is started but before the data transfer is completed. In this case, when a distance between the mobile terminal 100 and the MFP 10 exceeds the effective range of Wi-Fi® communication, data transfer via Wi-Fi® communication may fail and the print function of the MFP 10 might not completely finish. In the example embodiment, when data transfer from the mobile terminal 100 is performed via Wi-Fi® communication, the MFP 10 may display the first "transferring data" screen 53 including the message 53a on the LCD 16. Therefore, a situation in which data transfer via Wi-Fi® communication may fail (or be abandoned) may be prevented or reduced.

Figure 3F:
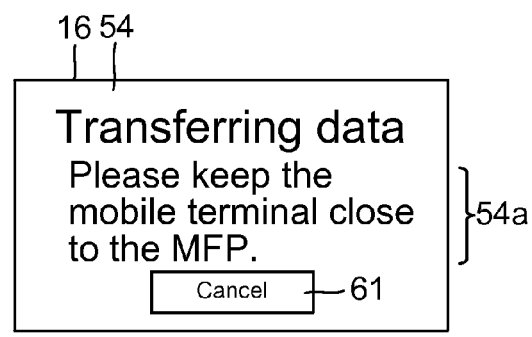

Referring to FIG. 3F, a second "transferring data" screen 54 may be displayed while data is being transferred via NFC communication in response to a print instruction. The second "transferring data" screen 54 may be a screen to indicate that the print function of the MFP 10 is being executed. The second "transferring data" screen 54 may comprise a message 54a that may advise not to place the mobile terminal 100 away from the MFP 10. The message 54a, "Please keep the mobile terminal close to the MFP" may be displayed in the example of FIG. 3F.

When data transfer from the mobile terminal 100 is performed via NFC communication, the MFP 10 may display the second "transferring data" screen 54 including the message 54a on the LCD 16. Therefore, it may be understood from the content of the message 54a that the mobile terminal 100 should not be moved away from the MFP 10. Accordingly, such a situation may be prevented or reduced that the mobile terminal 100 may be moved away from the MFP 10 to a position outside the effective range of NFC communication. Therefore, NFC communication between the mobile terminal 100 and the MFP 10 may be maintained to reliably complete data transfer via NFC communication.

As depicted in FIGS. 3E and 3F, the MFP 10 may display either the first "transferring data" screen 53 or the second "transferring data" screen 54 on the LCD 16 based on whether data transfer from the mobile terminal 100 is performed via Wi-Fi® communication or NFC communication. The first "transferring data" screen 53 and the second "transferring data" screen 54 may display the message 53a and message 54a, respectively, that is appropriate for the communication system being used for data transfer.

Figure 3G:
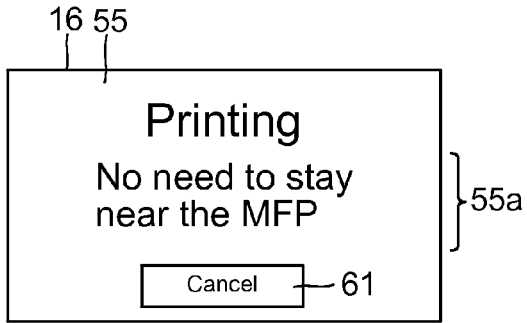

Referring to FIG. 3G, a "printing" screen 55 may be displayed when data transfer from the mobile terminal 100 is completed and the image is being printed based on the received image data. The "printing" screen 55 may be a screen that may indicate that the print function of the MFP 10 is being executed. The "printing" screen 55 may include a message 55a that may indicate that the mobile terminal 100 can be moved away from the MFP 10. The message 55a, "No need to stay near the MFP" may be displayed in the example of FIG. 3G. While the printing is being executed, data transfer from the mobile terminal 100 may already be completed. Therefore, there may be no concern if the mobile terminal 100 is moved outside the effective range set by communication systems.

As depicted in FIGS. 3E-3G, the first "transferring data" screen 53, the second "transferring data" screen 54, and the "printing" screen 55 may show a cancel button 61 to cancel the operation being performed. As the cancel button 61 is touched, the operation that is being performed and associated with the displayed screen, e.g., data transfer and printing, may be cancelled.

Figure 4:
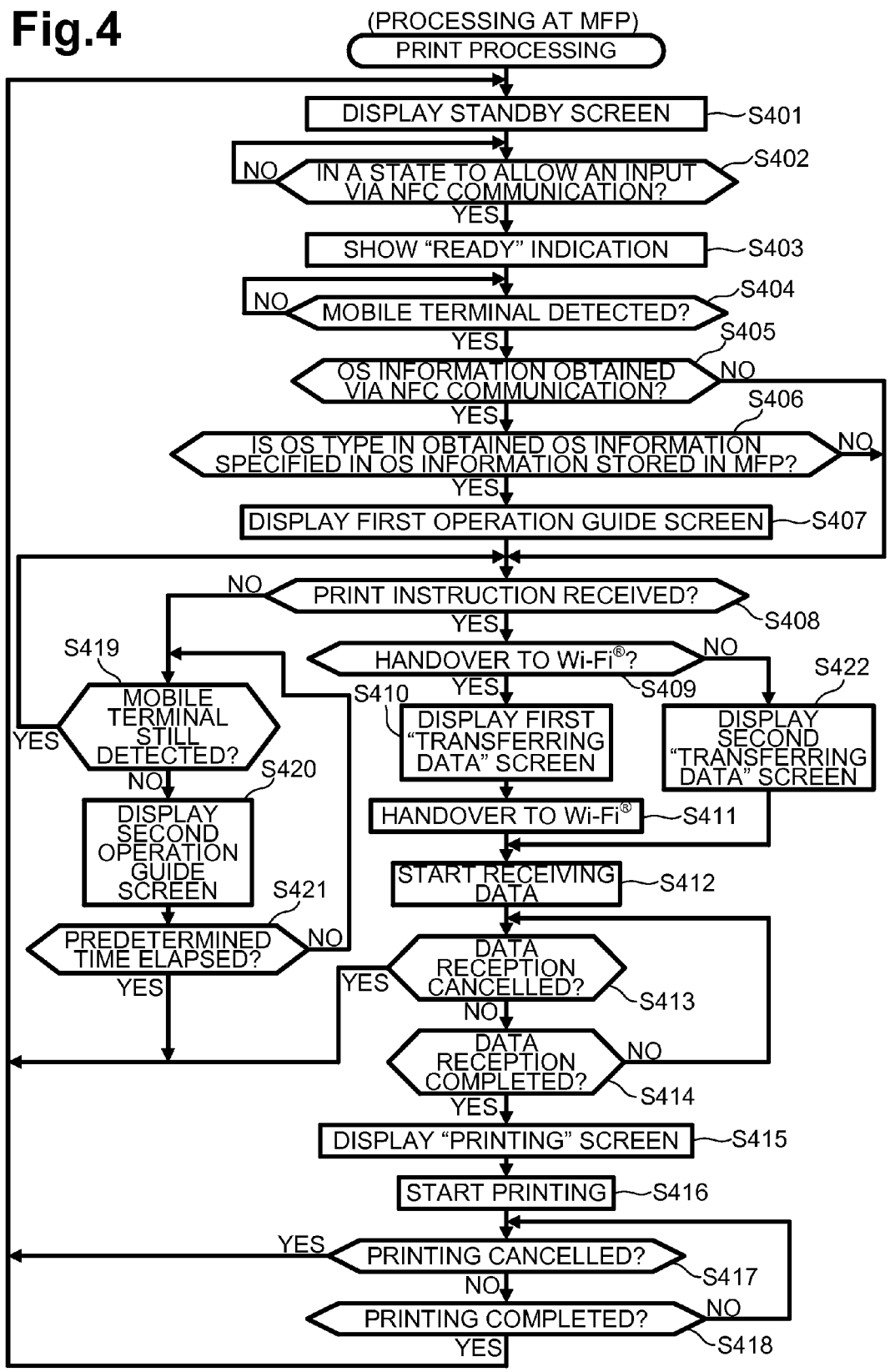
FIG. 4 is a flowchart depicting an example print process according to aspects of the disclosure.

The CPU 11 may execute a print processing as depicted in FIG. 4, based on the control program 12a. In the print processing, printing based on image data transferred from the mobile terminal 100 may be executed in response to a print instruction received from the mobile terminal 100, via NFC communication. The print processing may be started as the MFP 10 is turned on.

The CPU 11 may display the standby screen 50, for example, such as that depicted in FIG. 3A, on the LCD 16 (S401). Then, the CPU 11 may determine whether the MFP 10 is enabled to perform NFC communication (S402). In S402, for example, when the wireless LAN communication device 23 does not perform Wi-Fi® communication, the CPU 11 may determine that the MFP 10 is enabled to perform NFC communication. When the wireless LAN communication device 23 is executing Wi-Fi® communication, the CPU 11 may determine that the MFP 10 is not enabled to perform NFC communication. The CPU 11 also may determine that the MFP 10 is not enabled to perform NFC communication, for example, when an internal error or a mechanical error occurs in the MFP 10. For example, a mechanical error may occur when a document cover (not depicted) configured to cover a document plate (not depicted) of the scanner 18 may be open. Also, the CPU 11 may whether the MFP 10 is enabled or disabled to perform NFC communication based on a setting of the MFP 10 for activating or deactivating NFC communication.

In S402, when the CPU 11 determines that the MFP 10 is not enabled to perform NFC communication (S402: No), the CPU 11 may wait until the MFP 10 is enabled to perform NFC communication. When the CPU 11 determines that the MFP 10 is enabled to perform NFC communication (S402: Yes), the CPU 11 may show the "ready" indication 30, for example, such as that depicted in FIG. 3B, on the standby screen 50 to indicate that the MFP 10 is enabled to perform NFC communication (S403).

Then, the CPU 11 may determine whether the mobile terminal 100 is detected (S404). When the CPU 11 determines that the mobile terminal 100 is not detected (S404: No), the CPU 11 may wait for the mobile terminal 100 to be detected. When the CPU 11 determines that the mobile terminal 100 is detected (S404: Yes), the CPU 11 may determine whether information indicating the type of the OS being executed by the mobile terminal 100 is obtained from the detected mobile terminal 100 via NFC communication (S405). When NFC communication is enabled, the mobile terminal 100 may send information indicating its OS to MFP 10 via NFC communication.

When the CPU 11 determines that the OS information is obtained from the detected mobile terminal 100 via NFC communication (S405: Yes), the CPU 11 may determine the type of OS indicated by the obtained information and whether the type of OS is specified in the OS information 12b stored in the flash memory 12 (S406). The CPU 11 may determine that the type of the OS in the obtained OS information is specified in the OS information 12b if the type or name of the OS of the mobile terminal 100 is specified or included in the OS information 12b or information, e.g., a numeral, associated with the type of the OS of the mobile terminal 100 is specified in the OS information 12b. More specifically, for example, when the mobile terminal 100 sends "Android™ 1.1" as its OS information to the MFP 10 and "Android™ 1.0" is specified in the OS information 12b, the CPU 11 may determine that the type of the OS in the OS information obtained from the mobile terminal 100 may be specified or identified in the OS information 12b. When the CPU 11 determines that the type of the OS in the obtained OS information is specified or identified in the OS information 12b stored in the flash memory 12 (S406: Yes), the CPU 11 may display the first operation guide screen 51, for example, such as that depicted in in FIG. 3C, on the LCD 16, in place of the standby screen 50 (S407). Then, the CPU 11 may proceed to S408. The message 51a may be indicated on the first operation guide screen 51, so that the operation that needs to be performed on the mobile terminal 100 to start executing the print function of the MFP 10 may be understood.

When the CPU 11 determines that OS information is not received from the mobile terminal 100 (No at S405) or when the OS information is received but the OS identified by the OS information is not stored in the MFP 10 (No at S406), the CPU 11 might jump to step S408 to determine whether a print instruction is received. In other words, when the CPU 11 is not able to determine which OS the mobile terminal 100 is using, the CPU 11 might not display the first operation guide screen.

The CPU 11 may determine whether a print instruction is received from the mobile terminal 100 via NFC communication (S408). The print instruction may be transmitted from the mobile terminal 100 when the screen 151 (in FIG. 2B) displayed on the LCD 116 of the mobile terminal 100 is touched. When the CPU 11 determines that a print instruction is not received (S408: No), the CPU 11 may determine whether the mobile terminal 100 is still detected (S419). In S419, when the CPU 11 determines that the mobile terminal 100 is still detected (S419: Yes), the mobile terminal 100 may be positioned within the effective range of NFC communication. In this case, the CPU 11 may proceed to S408 where reception of a print instruction may be waited.

When the CPU 11 determines that the mobile terminal 100 is no longer detected (S419: No), the mobile terminal 100 may be moved to an area outside the effective range of NFC communication. In this case, the CPU 11 may display the second operation guide screen 52, for example, such as that depicted in FIG. 3D, on the LCD 16, in place of the first operation guide screen 51 (S420). As the message 52a is displayed in the second operation guide screen 52, an operation that needs to be performed on the mobile terminal 100 to start executing the print function of the MFP 10 may be understood.

After the process in S420, the CPU 11 may determine whether a predetermined time has elapsed since the CPU 11 determines that the mobile terminal 100 is no longer detected (S421). When the CPU 11 determines that the predetermined time has not elapsed (S421: No), the CPU 11 may return to S419. When the CPU 11 determines that the predetermined time has elapsed (S421: Yes), the CPU 11 may return to S401. Accordingly, the standby screen 50 may be displayed on the LCD 16, in place of the second operation guide screen 52.

In S408, when the CPU 11 determines that a print instruction is received via the NFC communication (S408: Yes), the CPU 11 may determine whether a setting stored in the MFP 10 indicates that a system of communication with the mobile terminal 100 is to be switched, e.g., whether to hand over a connection with the mobile terminal 100, from NFC communication to Wi-Fi® communication (S409). The MFP 10 may be configured to receive data transferred from the mobile terminal 100 via Wi-Fi® communication or NFC communication. When the CPU 11 determines that a setting indicates that the MFP 10 should use Wi-Fi® communication for data transfer with the mobile terminal 100, the CPU 11 may hand over a connection with the mobile terminal 100 from the short-range wireless communication device 22 to the wireless LAN communication device 23 in S409. When the CPU 11 determines that a setting indicates that the MFP 10 should use NFC communication for data transfer with the mobile terminal 100, the CPU 11 might not hand over communication with the mobile terminal 100 to the wireless LAN communication device 23 in S409.

A predetermined operation may be performed in the MFP 10 to select which of the Wi-Fi® communication or the NFC communication is used for data transfer from the mobile terminal 100. In another embodiment, the CPU 11 may be configured to receive, together with a print instruction, information that may designate which communication system (e.g., WiFi or NFC) to use for the data transfer from the mobile terminal 100. The communication system to be used for data transfer from the mobile terminal 100 may be determined, based on the information.

In S409, when the CPU 11 determines that such a setting is made in the MFP 10 that connection with the mobile terminal 100 may be handed over to the Wi-Fi® communication (S409: Yes), the CPU 11 may display the first "transferring data" screen 53, for example, such as that depicted in FIG. 3E, on the LCD 16, in place of the first operation guide screen 51 or the second operation guide screen 52 (S410). Then, the CPU 11 may hand over connection with the mobile terminal 100 to Wi-Fi® communication (S411). The CPU 11 may start receiving data for printing, e.g., print data, transferred from the mobile terminal 100, via Wi-Fi® communication, to the IP address of the MFP 10 (S412). The print data may comprise data of an image to be printed and print settings. After the CPU 11 detects the mobile terminal 100 in S404, e.g., after the CPU 11 determines in S409 that such a setting is made in the MFP 10 that connection with the mobile terminal 100 is handed over to Wi-Fi® communication, the MFP 10 may transmit its IP address to the mobile terminal 100, via NFC communication.

In S409, when the CPU 11 determines that such a setting is made in the MFP 10 that connection with the mobile terminal 100 is not handed over to Wi-Fi® communication (S409: No), the CPU 11 may display the second "transferring data" screen 54, for example, such as that depicted in FIG. 3F, on the LCD 16, in place of the first operation guide screen 51 or the second operation guide screen 52 (S422). Thereafter, the CPU 11 may start receiving data for printing from the mobile terminal 100, via NFC communication (S412).

After the data reception is started, the CPU 11 may determine whether the cancel button 61 displayed on the first "transferring data" screen 53 or the second "transferring data" screen 54 is touched (S413). When the CPU 11 determines that the cancel button 61 is touched (S413: Yes), the CPU 11 may cancel the data reception being executed, and may return to S401. Accordingly, the standby screen 50 may be displayed on the LCD 16, in place of the first "transferring data" screen 53 or the second "transferring data" screen 54.

When the data reception is not completed and the cancel button 61 is not touched during the data reception (S413: No, S414: No), the CPU 11 may continue the data reception. When the data reception is completed (S414: Yes), the CPU 11 may display the "printing" screen 55 on the LCD 16, in place of the first "transferring data" screen 53 or the second "transferring data" screen 54 (S415). Then, the CPU 11 may instruct the printer 19 to start printing based on the print data received from the mobile terminal 100 (S416).

The CPU 11 may determine whether the cancel button 61 displayed in the "printing" screen 55 or a cancel button displayed in the LCD 116 of the mobile terminal 100 is touched after printing is started (S417). When the CPU 11 determines that the cancel button 61 or the cancel button displayed in the LCD 116 is touched (S417: Yes), the CPU 11 may cancel the printing operation being executed and may return to S401. Accordingly, the standby screen 50 may be displayed on the LCD 16 in place of the "printing" screen 55. When the CPU 11 determines that the cancel button 61 is not touched and the printing operation is not completed (S417: No, S418: No), the CPU 11 may continue to execute the printing operation. When the printing operation is completed (S418: Yes), the CPU 11 may return to S401. Accordingly, the standby screen 50 may be displayed on the LCD 16 in place of the "printing" screen 55.

According to the example embodiment, when the type of operating system (OS) that the mobile terminal 100 may execute is a predetermined type, e.g., the Android™ OS, the MFP 10 may display on the LCD 16 the first operation guide screen 51 including the message 51a that may show the necessary operation to execute the print function of the MFP 10. Therefore, as the first operation guide screen 51 is displayed, a necessary operation to start executing the print function of the MFP 10 may be notified. Therefore, such a situation may be prevented or reduced that the necessary operation might not be performed to use the print function of the MFP 10. Thus, in the example embodiment, the print function of the MFP 10 may be readily utilized from the mobile terminal 100 using NFC communication. The first operation guide screen 51 may be displayed when the type of the OS that the mobile terminal 100 may execute is a predetermined type, and might not be displayed when the type of OS that the mobile terminal 100 may execute is other type than the predetermined type. Therefore, when the print function of the MFP 10 is used by the mobile terminal 100, an operation associated with a type of the OS that the mobile terminal 100 may execute, may be performed.

Even when the CPU 11 determines that the mobile terminal 100 is no longer detected after the first operation guide screen 51 is displayed, the second operation guide screen 52 may be displayed, until the predetermined time has elapsed since the CPU 11 determines that the mobile terminal 100 is no longer detected. Therefore, even when the mobile terminal 100 is moved further away from the MFP 10 to disenable NFC communication before an operation necessary to start executing the print function of the MFP 10 is performed, the second operation guide screen 52 may indicate an operation necessary to start executing the print function of the MFP 10. Accordingly, such a situation may be prevented or reduced that the print function of the MFP 10 cannot be used.

In the above-described example embodiment, the MFP 10 may be an example of a function execution device. The mobile terminal 100 may be an example of an external device. The short-range wireless communication device 22 may be an example of a communication device. The wireless LAN communication device 23 may be an example of a communication device. The printer 19 may be an example of a function device and a printing device. The LCD 16 may be an example of a display device. The CPU 11 may be an example of a control device. The flash memory 12 may be an example of a storage device. The OS 112a may be an example of an operating system. The OS information 12b may be an example of specific information. The OS information received from the mobile terminal 100 may be an example of system information. NFC communication may be an example of short-range wireless communication. Wi-Fi® communication may be an example of a wireless communication system whose communication effective range may be larger than that of short-range wireless communication. The standby screen 50 may be a predetermined screen. The first operation guide screen 51 may be an example of a guide screen. The second operation guide screen 52 may be an example of a guide screen. The first "transferring data" screen 53, the second "transferring data" screen 54, and the "printing" screen 55 may be examples of other screens. The CPU 11 executing the process in S401 may be an example of a screen display device. The CPU 11 executing the process in S404 may be an example of a communication determination device. The CPU 11 executing the process in S407 may be an example of a screen display device. The CPU 11 executing the processes in S410, S415, and S422 may be an example of a screen display device. The CPU 11 executing the process in S405 may be an example of a receiving device. The CPU 11 executing the process in S406 may be an example of a system determination device. The CPU 11 executing the process in S419 may be an example of a communication determination device. The CPU 11 executing the process in S421 may be an example of a time determination device. The CPU 11 executing the process in S412 may be an example of a data communication device.

While the disclosure has been described in detail with reference to specific embodiments, these are merely examples, and various changes, arrangements and modifications may be applied therein without departing from the spirit and scope of the disclosure.

For example, in the above-described example embodiments, the MFP 10 may be an example of a function execution device. In addition to the MFP 10 having a plurality of functions, other devices configured to execute at least one function may serve as the function execution device. Devices configured to execute at least one function may comprise devices specialized in a single function, e.g., a printer and a scanner, and devices, e.g., a personal computer, having, for example, a storing function.

In the above-described example embodiments, the print function of the MFP 10 may be an example of a function that the mobile terminal 100 may utilize. In other embodiments, the disclosure may be applied when the mobile terminal 100 uses functions of the MFP 10 other than the print function. For example, the disclosure may be applied to: 1) transmit image data or document data from the mobile terminal 100 to another device using a facsimile function of the MFP 10, 2) transmit various data stored in the mobile terminal 100 to the MFP 10 for storing the various data in the MFP 10, or 3) transmit various data stored in the mobile terminal 100 to a cloud server (not depicted) on the Internet via the MFP 10. In yet another embodiment, the disclosure may be applied when scan data obtained using a scan function of the MFP 10 is stored in the mobile terminal 100. More specifically, to use a function that the MFP 10 may be executable from the mobile terminal 100, a screen, similar to the first operation guide screen 51, including a message that may show a necessary operation to execute the function of the MFP 10 may be displayed on the LCD 16 when the MFP 10 detects the mobile terminal 100.

In the above-described example embodiments, NFC communication and Wi-Fi® communication may be used to connect between the MFP 10 and the mobile terminal 100. Aspects of the disclosure may be applied in other embodiments where NFC communication may be used to connect between the MFP 10 and the mobile terminal 100. In the above-described example embodiment, data may be transferred from the mobile terminal 100 to the MFP 10 via Wi-Fi® communication or NFC communication. In other embodiments, data may be transferred via other wireless communication, e.g., Bluetooth® communication (Bluetooth® is a registered certification mark owned by Bluetooth SIG, Inc. of Kirkland, Wash.). In the above-described example embodiments, contactless communication, e.g., NFC communication conforming to NFC standards, may be employed for short-range wireless communication. In other embodiments, contactless communication conforming to other standards, e.g., TransferJet™ (TransferJet™ is a registered certification mark owned by Sony Corporation of Tokyo, JAPAN), may be employed for short-range wireless communication.

In the above-described example embodiments, the external device utilizing functions of the MFP 10 may be a mobile terminal 100, e.g., a smartphone or a cellular phone. In other embodiments, other devices that may enable NFC communication in addition to the mobile terminal 100 may be employed as the external device utilizing functions of the MFP 10. For example, if devices, e.g., a tablet terminal, a personal computer, a digital camera, and a music player, are configured to allow or enable NFC communication, such devices may serve as the external device that may utilize a function of the MFP 10.

In the above-described example embodiments, the OS 112a of the mobile terminal 100 may be the Android™ OS, for example. In other embodiments, other OS may be employed. In the above-described example embodiments, when the OS 112a of the mobile terminal 100 is the Android™ OS, the first operation guide screen 51 including the message 51a that may suggest that the screen needs to be touched may be displayed on the LCD 16. In other embodiments, when an operation required to start executing a function of the MFP 10 differs according the types of the OS of mobile terminals, a plurality of operation guide screens, similar to the first operation guide screen 51, each including a different content of a message showing a necessary operation may be prepared according the types of the OS of the mobile terminals. The operation guide screen to be displayed on the LCD 16 may be changed based on the received OS information.

In the above-described example embodiments, a screen that may be displayed while data is being transferred (e.g., the first "transferring data" screen 53 and the second "transferring data" screen 54) and a screen that may be displayed when an image is being printed (e.g., the "printing" screen 55) may be given as an example of a screen to be displayed after the MFP 10 has received the print instruction from the mobile terminal 100. A screen that may be displayed after the MFP 10 has received the print instruction from the mobile terminal 100 might not be limited to the screens 53, 54, and 55, as long as the screen may indicate that a print function is being executed. In another embodiment, for example, when a communication system is changed, a screen indicating that the communication system is being changed may be displayed in addition to the screens 53, 54, and 55. In yet another embodiment, the "printing" screen 55 may be displayed after the MFP 10 has received the print instruction from the mobile terminal 100, without displaying the first "transferring data" screen 53 or the second "transferring data" screen 54.

In the above-described example embodiments, when the CPU 11 determines that the mobile terminal 100 is no longer detected after the first operation guide screen 51 is displayed, the second operation guide screen 52 may be displayed on the LCD 16 in place of the first operation guide screen 51. In another embodiment, the first operation guide screen 51 may be continuously displayed without changing the first operation guide screen 51 to the second operation guide screen 52. In this case, a necessary operation to start executing the print function of the MFP 10 may be understood from the content of the first operation guide screen 51. Therefore, such a situation that the print function of the MFP 10 fails may be prevented or reduced. When the CPU 11 determines that the mobile terminal 100 is no longer detected, the second operation guide screen 52 comprising the message 52 may be displayed, so that the necessity of bringing the mobile terminal 100 into close proximity to the MFP 10 again may be notified.

In the above-described example embodiment, the first operation guide screen 51 may be continuously displayed while the CPU 11 determines that the mobile terminal 100 is still detected after the first operation guide screen 51 is displayed. In another embodiment, the first operation guide screen 51 may be displayed intermittently, at an interval of, for example, a few seconds, while the CPU 11 determines that the mobile terminal 100 is still detected after the first operation guide screen 51 is displayed. In yet another embodiment, when the CPU 11 determines that the mobile terminal 100 is still detected after the first operation guide screen 51 is displayed, the first operation guide screen 51 may be changed to another screen after the elapse of a predetermined period of time (e.g., three seconds). Similarly, the second operation guide screen 52 may be intermittently displayed, instead of being continuously displayed. Further, after the second operation guide screen 52 is displayed, the second operation guide screen 52 may be hidden from view at a predetermined timing before the CPU 11 may determine that the predetermined time has elapsed in S421.

In the above-described example embodiments, a threshold value, e.g., the predetermined time, in a process in S421 may be the time elapsed since the CPU 11 determines that the mobile terminal 100 is no longer detected. In another embodiment, the predetermined time may be the time elapsed from a predetermined timing after the first operation guide screen 51 is displayed. The predetermined timing after the first operation guide screen 51 is displayed may be, for example, at a time when the first operation guide screen 51 is displayed, at the time a few seconds after the first operation guide screen 51 is displayed, or at the time when the second operation guide screen 52 is displayed.

In the above-described example embodiments, the print data to be transferred to the MFP 10 from the mobile terminal 100 in S412 may comprise the data of an image to be printed and print settings. In another embodiment, when the MFP 10 is configured to execute printing based on page description language, the print data may be generated by the mobile terminal 100 based on the data of an image to be printed and print settings in page description language.

In the above-described example embodiments, the CPU 11 may be configured to execute the processing depicted in FIG. 4. In another embodiment, one or more CPUs may be configured to execute the processing depicted in FIG. 4. In yet another embodiment, one or more integrated circuits ("ICs"), e.g., application specific integrated circuits ("ASICs"), or a combination of one or more CPUs and one or more ICs may be configured to execute the processing depicted in FIG. 4.

What is claimed is:

1. A function execution device comprising:
    a communication device configured to communicate with an external device using a short-range communication protocol;
    a function device configured to execute a predetermined function;
    a display device;
    at least one processor; and
    a memory storing computer-readable instructions that, when executed by the at least one processor, instruct the function execution device to perform steps comprising:
    displaying a first screen on the display device;
    determining whether the communication device is in communication with the external device using the short-range communication protocol; and
    displaying, on the display device, a second screen indicating an operation to be performed using the external device to start executing the predetermined function of the function device in response to determining that the communication device is in communication with the external device using the short-range communication protocol.

2. The function executing device according to claim 1, wherein the computer-readable instructions, when executed by the at least one processor, further instruct the function executing device to perform a step comprising:
    displaying, on the display device, a third screen indicating that the predetermined function is being executed by the function device in response to receiving an instruction from the external device when the operation is performed using the external device.

3. The function executing device according to claim 1, wherein the function executing device further comprises a storage device configured to store specific information specifying at least one type of operating system;
    wherein the computer-readable instructions, when executed by the at least one processor, further instruct the function executing device to perform steps comprising:
    receiving, from the external device, system information specifying a first type of operating system executed by the external device; and
    determining, in response to receiving the system information from the external device, whether the first type of operating system specified by the system information matches one of the at least one type of the operating system specified by the specific information; and
    wherein the step of displaying the second screen comprises displaying the second screen in response to determining that the first type of the operating system specified by the system information matches one of the at least one type of operating system specified by the specific information.

4. The function executing device according to claim 3, wherein the computer-readable instructions, when executed by the at least one processor, further instruct the function executing device to perform a step comprising:
    displaying, on the display device, a third screen indicating that the predetermined function is being executed by the function device in response to receiving an instruction from the external device to perform the predetermined function when determining that the first type of operating system specified by the system information does not match one of the at least one type of the operating system specified by the specific information.

5. The function executing device according to claim 1, wherein the computer-readable instructions, when executed by the at least one processor, further instruct the function executing device to perform a step comprising:
    determining whether system information specifying a type of operating system executed by the external device is received from the external device; and
    wherein the step of displaying the second screen comprises displaying the second screen in response to determining that the system information is received from the external device.

6. The function executing device according to claim 5, wherein the computer-readable instructions, when executed by the at least one processor, further instruct the function executing device to perform a step comprising:
    displaying, on the display device, a third screen indicating that the predetermined function is being executed by the function device in response to receiving an instruction from the external device to perform the predetermined function when determining that the system information is not received from the external device.

7. The function executing device according to claim 1, wherein the computer-readable instructions, when executed by the at least one processor, further instruct the function executing device to perform a step comprising:
    receiving, from the external device, system information specifying a type of operating system executed by the external device; and
    wherein the step of displaying the second screen comprises displaying a message included in the second screen that shows the operation, the message based on the type of operating system specified by the received system information.

8. The function executing device according to claim 1, wherein the operation to be performed comprises touching a screen of the external device.

9. The function executing device according to claim 1, wherein the computer-readable instructions, when executed by the at least one processor, further instruct the function executing device to perform steps comprising:
detecting whether the communication device is in communication with the external device using the short-range communication protocol; and
after displaying the second screen, displaying, on the display device, an updated second screen in response to detecting that the communication device is not in communication with the external device using the short-range communication protocol.

10. The function executing device according to claim 9, wherein the computer-readable instructions, when executed by the at least one processor, further instruct the function executing device to perform a step comprising:
determining whether a predetermined time has elapsed from a time at which the updated second screen is displayed;
wherein the step of the displaying the updated second screen comprises:
after displaying the second screen, displaying the updated second screen continuously until the predetermined time has elapsed in response to detecting that the communication device is not in communication with the external device using the short-range communication protocol;
displaying the first screen in response to determining that the predetermined time has elapsed.

11. The function executing device according to claim 10, wherein the updated second screen comprises a message that indicates an operation to be performed to start executing the predetermined function of the function device.

12. The function executing device according to claim 1, wherein the computer-readable instructions, when executed by the at least one processor, further instruct the function executing device to perform steps comprising:
after displaying the second screen, displaying, on the display device, an updated second screen in response to detecting that the communication device is not in communication with the external device using the short-range communication protocol;
after displaying the updated second screen, determining whether a predetermined time has elapsed from a time at which the function executing device detects that the communication device is not in communication with the external device using the short-range communication protocol; and
displaying the first screen in response to determining that the predetermined time has elapsed.

13. The function executing device according to claim 1, wherein the short-range communication protocol complies with Near Field Communication standards.

14. The function execution device according to claim 1, further comprising:
a second communication device configured to communicate with the external device using a wireless communication protocol which is different from the short-range communication protocol;
wherein the computer-readable instructions, when executed by the at least one processor, further instruct the function executing device to perform steps comprising:
receiving an instruction from the external device using the communication device or the second communication device; and
displaying, on the display device, a third screen indicating that the predetermined function is being executed by the function device in response to receiving the instruction, the third screen comprising a first message when using the communication device or a second message when using the second communication device.

15. The function executing device according to claim 14, wherein the second communication device is configured to communicate over a larger range than the communication device; and
wherein the second message comprises a recommendation to keep the external device near the function executing device.

16. The function executing device according to claim 14, wherein the first message comprises instructions to keep the external device close to the function executing device.

17. The function executing device according to claim 1, wherein the function device comprises a printing device configured to print an image onto a recording sheet based on image data received from the external device.

18. The function executing device according to claim 1, wherein the step of displaying the second screen comprises:
continuing to display the second screen until determining that the communication device is not in communication with the external device.

19. A non-transitory computer-readable storage medium storing computer-readable instructions therein that, when executed by a function execution device comprising a communication device, a function device, and a display device, instruct the function execution device to:
display a first screen on the display device;
determine whether the communication device is in communication with an external device using a short-range communication protocol; and
display, on the display device, a second screen indicating an operation to be performed using the external device to start executing a predetermined function of the function device in response to determining that the communication device is in communication with the external device using the short-range communication protocol.

20. The non-transitory computer-readable storage medium of claim 19, wherein the computer-readable instructions, when executed by the function execution device, further instruct the function execution device to:
detect whether the communication device is in communication with the external device using the short-range communication protocol; and
after displaying the second screen, display, on the display device, an updated second screen in response to detecting that the communication device is not in communication with the external device using the short-range communication protocol, the updated second screen presenting a different message than that of the second screen.

* * * * *